(12) United States Patent
Landau et al.

(10) Patent No.: US 7,983,367 B2
(45) Date of Patent: Jul. 19, 2011

(54) METHOD AND SYSTEM FOR DYNAMIC ADAPTATION AND COMMUNICATING DIFFERENCES IN FREQUENCY—TIME DEPENDENT SYSTEMS

(75) Inventors: Uri Landau, San Diego, CA (US); Mark Kent, Vista, CA (US); Vinko Erceg, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 991 days.

(21) Appl. No.: 11/848,418

(22) Filed: Aug. 31, 2007

(65) Prior Publication Data

US 2008/0165839 A1 Jul. 10, 2008

Related U.S. Application Data

(60) Provisional application No. 60/884,179, filed on Jan. 9, 2007.

(51) Int. Cl.
*H04L 1/20* (2006.01)
(52) U.S. Cl. .......................... 375/346; 375/227; 375/285
(58) Field of Classification Search .................. 375/227, 375/267, 285, 346
See application file for complete search history.

(56) References Cited

U.S. PATENT DOCUMENTS

| | | | |
|---|---|---|---|
| 2005/0008092 A1* | 1/2005 | Kadous | 375/267 |
| 2005/0031047 A1* | 2/2005 | Maltsev et al. | 375/260 |
| 2005/0238108 A1* | 10/2005 | Suh et al. | 375/260 |
| 2006/0245470 A1* | 11/2006 | Balachandran et al. | 375/133 |
| 2007/0230324 A1* | 10/2007 | Li et al. | 370/204 |

* cited by examiner

*Primary Examiner* — Shuwang Liu
*Assistant Examiner* — David Huang
(74) *Attorney, Agent, or Firm* — McAndrews, Held & Malloy, Ltd.

(57) ABSTRACT

Aspects of a method and system for dynamic adaptation and communicating differences in frequency-time dependent systems may include generating a time difference weighting factor and a frequency difference weighting factor, based on at least channel estimates. A time-frequency difference may be computed by forming a weighted sum comprising a time difference and a frequency difference, where forming the weighted sum uses at least the time difference weighting factor and the frequency weighting factor. A channel quality indicator (CQI) feedback message may be generated, comprising the time-frequency difference. The time difference weighting factor and/or the frequency difference weighting factor may be generated adaptively at a base station or a mobile terminal. The time difference and/or the frequency difference may be generated from estimated Signal-to-Noise-Ratios (SNRs) associated with the channel estimates. The SNRs may be based on at least the output of an MMSE receiver.

18 Claims, 3 Drawing Sheets

METHOD AND SYSTEM FOR DYNAMIC ADAPTATION AND COMMUNICATING DIFFERENCES IN FREQUENCY—TIME DEPENDENT SYSTEMS

CROSS-REFERENCE TO RELATED APPLICATIONS/INCORPORATION BY REFERENCE

This application makes reference to, claims priority to, and claims the benefit of U.S. Provisional Application Ser. No. 60/884,179, filed on Jan. 9, 2007.

The above referenced application is hereby incorporated herein by reference in its entirety.

FIELD OF THE INVENTION

Certain embodiments of the invention relate to signal processing for communication systems. More specifically, certain embodiments of the invention relate to a method and system for dynamic adaptation and communicating differences in frequency-time dependent systems.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power and bandwidth, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

For example, the European Telecommunication Standards Institute (ETSI) and the Third Generation Partnership Project (3GPP) were the driving forces in establishing and evolving the Universal Mobile Telecommunications System (UMTS), a third generation evolutionary cellular mobile system that has grown out of the enormously successful GSM (Global System for Mobile Communications) standard. Basic UMTS with theoretical data rates of up to 2 Mbps has evolved over the last few years to comprise High Speed Downlink Packet Access (HSDPA) and High Speed Uplink Packet Access (HSUPA). These standard extensions use advanced signal processing techniques and network management to enhance available data throughputs. Theoretical downlink rates of up to 14.4 Mbps and uplink rates of 5.8 Mbps may be achieved and are a further step towards truly mobile broadband services.

Following the standardization of HSDPA and HSUPA, 3GPP members launched a new initiative named Long Term Evolution (LTE), concerned primarily with the evolution of the Universal Terrestrial Radio Access (UTRA) Network to support future services with even higher data rates, lower latency and more flexibility in spectrum usage and use scenarios for packet-based mobile telecommunication systems. Regarding the physical layer, bandwidths from as little as 1.25 MHz up to 20 MHz were agreed upon to provide the required spectral flexibility and in December 2005, it was decided that the downlink would be using Orthogonal Frequency Division Multiplexing (OFDM), whereas the uplink will use Single-Carrier—Frequency Division Multiple Access (SC-FDMA). Furthermore, it was agreed that MIMO operations will be incorporated as an optional, yet fundamental design feature, with up to four antennas that may be provided at both the user equipment (UE—mobile device) and the Node B (a base station in UMTS). The most effective use of MIMO technologies may require consideration of MIMO-specific design features from the outset and incorporation of various features that permit MIMO usage to leverage its potential beyond a mere add-on feature. Target peak data rates of this Evolved Universal Terrestrial Radio Access (E-UTRA) system are as high as 100 Mbps in the downlink with a 20 MHz bandwidth and up to 50 Mbps in a 20 MHz uplink bandwidth.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for dynamic adaptation and communicating differences in frequency-time dependent systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for dynamic adaptation and communicating differences in frequency-time dependent systems. Aspects of the invention may comprise generating a time difference weighting factor and a frequency difference weighting factor, based on at least channel estimates. A time-frequency difference may be computed by forming a weighted sum comprising a time difference and a frequency difference by using at least the time difference weighting factor and the frequency weighting factor. A channel quality indicator (CQI) feedback message may be generated, comprising the time-frequency difference.

The time difference weighting factor and/or the frequency difference weighting factor may be generated adaptively at a base station or a mobile terminal. The time difference and/or the frequency difference may be generated from estimated Signal-to-Noise-Ratios (SNRs) associated with the channel estimates. The SNRs may be based on at least the output of an MMSE receiver. The time difference and/or the frequency difference may be generated from estimated capacities associated with the channel estimates, which may be obtained based on at least an output of an MMSE receiver. The time-frequency difference may be generated according to the following relationship: $\Delta C_{Time\text{-}Frequency} = \alpha \Delta C_{Time} + \beta \Delta C_{Frequency}$, where $\Delta C_{Time\text{-}Frequency}$ may be the time-frequency difference, $\Delta C_{Time}$ may be the time difference, $\Delta C_{Frequency}$ may be the frequency difference, $\alpha$ may be the time difference weighting factor, and $\beta$ may be the frequency difference weighting factor. The time difference weighting factor and/or the frequency difference weighting factor may be generated according to the following relationship: $\alpha = \alpha'/(\alpha' + \beta')$; $\beta = \beta'/(\alpha' + \beta')$; $\alpha' = 1 - W(n)/W_{max}$; $\beta' = 1 - \tau(n)/\tau_{max}$, where $\alpha$ may be the time difference weighting factor, $\beta$ may be the frequency difference weighting factor, $\tau(n)$ may be an estimated delay spread, $\tau_{max}$ may be an estimated maximum delay spread, $W(n)$ may be an estimated Doppler frequency, and $W_{max}$ may an estimated maximum Doppler frequency.

Figure 1A:
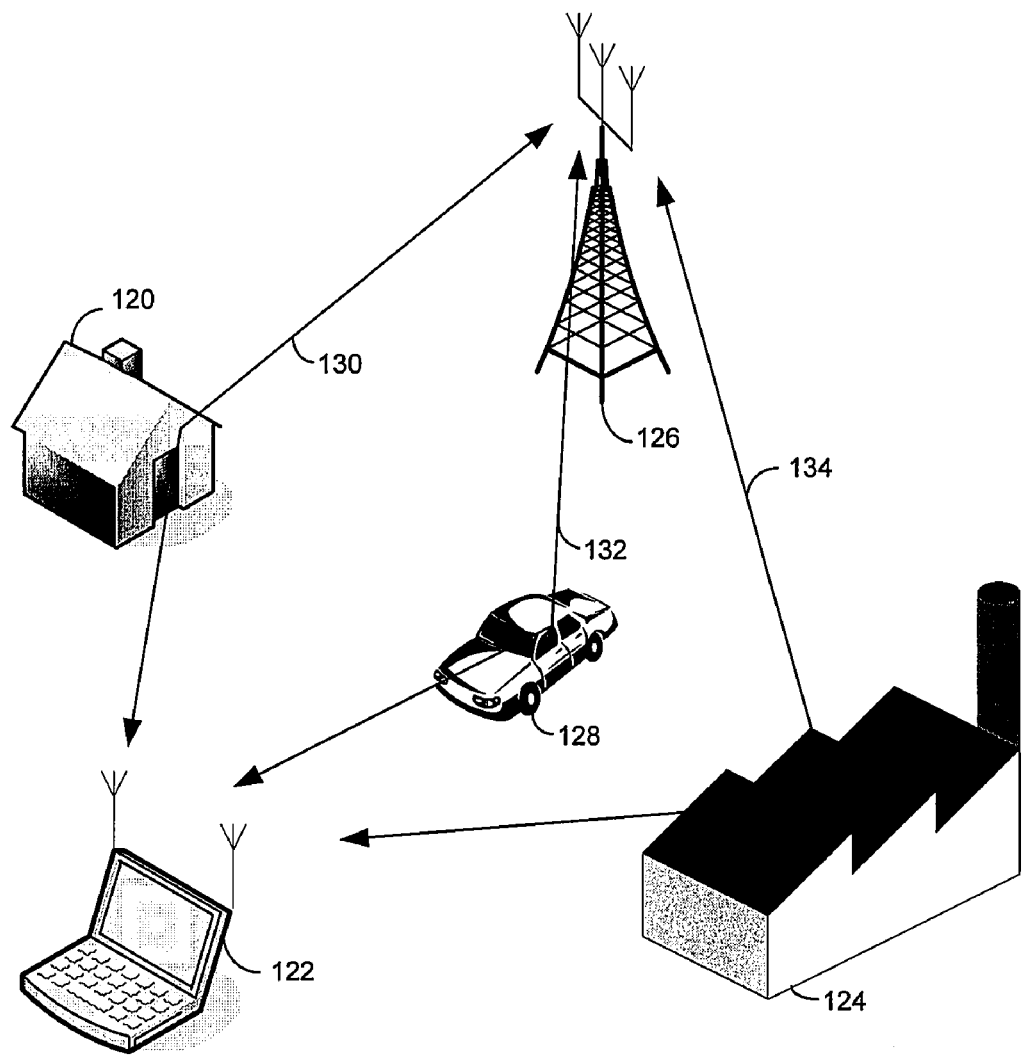
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a house 120, a mobile terminal 122, a factory 124, a base station 126, a car 128, and communication paths 130, 132 and 134.

The base station 126 and the mobile terminal 122 may comprise suitable logic, circuitry and/or code that may be enabled to generate and process MIMO communication signals. Wireless communication between the base station 126 and the mobile terminal 122 may take place over a wireless channel. The wireless channel may comprise a plurality of communication paths, for example, the communication paths 130, 132 and 134. The wireless channel may change dynamically as the mobile terminal 122 and/or the car 128 moves. In some cases, the mobile terminal 122 may be in line-of-sight (LOS) of the base station 126. In other instances, there may not be a direct line-of-sight between the mobile terminal 122 and the base station 126 and the radio signals may travel as reflected communication paths between the communicating entities, as illustrated by the exemplary communication paths 130, 132 and 134. The radio signals may be reflected by man-made structures like the house 120, the factory 124 or the car 128, or by natural obstacles like hills. Such a system may be referred to as a non-line-of-sight (NLOS) communications system.

A communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 122. The communication paths 130, 132 and 134 may also be differently attenuated. In the downlink, for example, the received signal at the mobile terminal 122 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 122, in particular for NLOS communication systems.

Figure 1B:
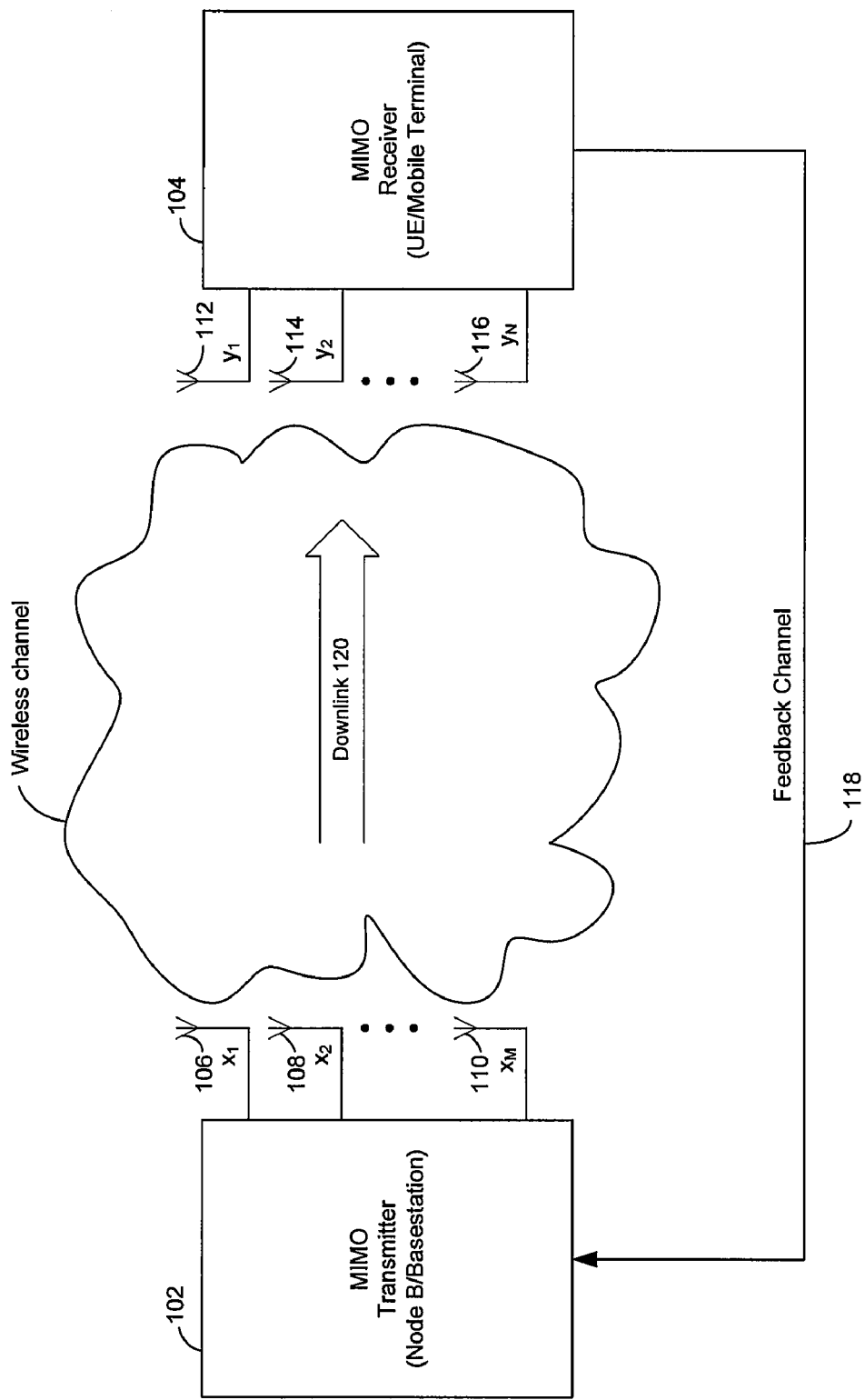
FIG. 1B is a diagram illustrating an exemplary MIMO downlink communication system with feedback, in accordance with an embodiment of the invention.

FIG. 1B is a diagram illustrating an exemplary MIMO downlink communication system with feedback, in accordance with an embodiment of the invention. Referring to FIG. 1B, there is shown a MIMO transmitter 102 and a MIMO receiver 104, and antennas 106, 108, 110, 112, 114 and 116. There is also shown a wireless channel comprising a downlink 120, and a feedback channel 118. There may be M transmitter antennas and N receiver antennas. There is also shown transmit symbols $x_1$, $x_2$, and $X_M$, and receive symbols $y_1$, $Y_2$, and $Y_N$.

The MIMO transmitter 102 may comprise suitable logic, circuitry and/or code that may be enabled to generate transmit symbols $x_i$ i∈{1, 2, ..., M} that may be transmitted by the transmit antennas, of which the antennas 106, 108 and 110 may be depicted in FIG. 1B. The MIMO transmitter 102 may be, for example, a Node B in UMTS or a base station in a general wireless system. The MIMO receiver 104 may comprise suitable logic, circuitry and/or code that may be enabled to process the receive symbols $y_i$ i∈{1, 2, ..., M}. The MIMO receiver may be a User Equipment (UE) in UMTS or a mobile terminal in a general wireless system.

At the MIMO transmitter 102, a data symbol may be transmitted simultaneously over all antennas or a symbol may be transmitted on one antenna only, that is, the transmit symbols $x_i$ may be a function of an arbitrary number of data symbols. The receive symbols $y_i$ may receive a superposition of the transmitted signals from up to M antennas 106 through 110, after the transmitted signals have traversed the downlink channel 120 on the wireless channel. The feedback channel 118 may be a logical channel that may be within an uplink physical channel. The uplink may carry data and/or control information from the MIMO receiver 104 to the MIMO transmitter 102 and may be characterized by carrying data in the direction opposite to the downlink 120. Unless noted otherwise, uplink and feedback channel 118 may be used synonymously here. In a MIMO wireless channel, such as downlink 120, it may be possible to achieve several parallel spatial streams. Spatial streams may be data streams that may be non-interfering (weakly interfering in practice) from the MIMO transmitter 102 to the MIMO receiver 104, through the use of appropriate signal processing at the MIMO transmitter 102 and/or the MIMO receiver 104. Spatial streams may be a particularly attractive feature of MIMO channels since spatial streams may behave similarly to parallel, non-interfering single antenna communications systems. Since such a MIMO system may use the same bandwidth and transmission power like a single antennas communication system, the available bandwidth resources may be exploited more optimally, leading to high spectral efficiency. The number of spatial streams may be less than or equal to the number of receive or transmit antennas, whichever may be smaller.

In the mobile network proposed by the LTE project, advanced techniques such MIMO transmit/receive antennas, that may provide a multifold increase in the data rate coupled with reduced latency in Node B time response, may create a wide scope of services that the network may provide. Services may vary from video to be watched to downloading of data files and/or sending text messages, for example. The services may be characterized by, for example: the mean information-rate (bit/sec), the reliability (mean error-rate) that may be required and/or the mean of the delay a user may experience. Some applications may require more sophisticated characterizations, for example, peak-to-peak change, variance and/or bandwidth of any one of the parameters. Other considerations may comprise the capability of the UE. For example, buffer-size allocation, bandwidth and/or features such as receiving multiple spatial streams or coded streams.

In some instances, it may be understood that the network may be offering improved efficiency and effectiveness if the network may be capable to better match offered services to the user's need. However, tailoring these services may require resource allocation. Consequently, a mechanism may be proposed for such a goal, that may be characterized not only by the gain it may provide (in terms of reduced transmitted power or data-rate, for example) but also by the added load it may impose. In some embodiments of the invention, examples for such mechanisms in WCDMA networks may comprise the reporting, to Node B, of one or more parameters that may be associated with the mobile SNR and that may be referred to as CQI (Channel Quality Indicator) or, parameters that may be associated with the communication channel, for example, frequency selective channel information and Closed-loop operation mode. In some instances, the added cost may be due to additional hardware in the mobile phone and/or the Node B, as well as the need to feed back information in a timely fashion, from one or more users to the Node B.

Reporting the mobile status to the Node B may be extended in the HSDPA standard. Data, in this standard, may be transmitted in packets. The mobile may acknowledge to the Node B whether a packet may have been successfully decoded (ACK). If not, NACK may be sent and a retransmission of the same packet may be pursued. Only part of the packet may be retransmitted; the mobile, which may, in some instances, be capable of combining multiple retransmissions, may attempt to decode the combined packet, which may become more reliable with each retransmission. This mechanism may be referred to as HARQ (Hybrid Automatic Request) and may require the usage of down-link control shared channels (as well as, in some instances, up-link channels). A Mobile-A may continuously identify, for example, by decoding the control channel, whether an incoming packet may comprise a tag-A. In this case, the modulation scheme (QPSK or QAM16) may be identified, the bits may be transmitted (for example, rate-matching scheme) and the packet (it may store, in some instances, more than one coded packet).

The standard in the future may evolve to support, as mentioned in the Background section, more complex transmit and/or receive protocols: transmit/receive through multiple antennas, multiple spatial streams, multiple coded streams, for example. Further parameterization of the service may be carried out through the PRB allocations (Physical Resource Block) In one exemplary embodiment of the invention, there may be 12 adjacent OFDM carriers. A PRB may be associated with a communication channel that may be characterized by a channel response between one or more transmit antenna and one or more receive antennas. For example, a 4×4 (4-receive, 4-transmit antennas) or a 1×1 antenna array. In some instances, a PRB may be characterized by a channel SNR and/or PRBS identifiers.

To utilize the cooperation of the Node B transmitter in a protocol similar to HARQ as it may be used in the HSDPA standard, the CQI of the entire bandwidth (quantized into, for example, 50 PRBs) may be made available at the transmitter. In these instances, sharing of resources (PRBs) may be prioritized for a user, for example based on capacity and/or throughput to the network.

The information above may represent significant amounts of data, whose rate of change may depend on a number of factors, for example, on the mobility of the user.

In an OFDM MIMO network, for example E-UTRA, the CQI may be defined over a set of adjacent frequencies (also known as sub-carriers or tones) that may have similar channel-responses. Such a block of tones may be called a physical resource block (PRB), as described above. In one exemplary embodiment of the invention, a bandwidth of 10 MHz may be available. This bandwidth may be partitioned into tones that may be spaced, for example, 15 kHz from each other. For example, 300 tones may be available for transmitting information. These 300 tones may be divided into 50 PRBs of 12 adjacent tones each, so that 12 tones/PRB×50 PRB=300 tones.

In instances where a resource block (RB) may be used to stream information intended for just one user (or UE), for example, a plurality of UEs may not share the same tones simultaneously, and different UEs may be allocated different frequency and/or time resources by the base station (also referred to as Node B). In instances where a resource allocation may be desirable, the allocation of frequency resources, for example by allocating PRBs, may be prioritized by user (or UE), based on the channel quality of a particular PRB for a particular user. Since the channel quality may vary, for example when a UE changes location in a cell coverage area, a Node B may reallocate PRB's for a UE in order to ensure that the requested services and/or service levels may be maintained. In one embodiment of the invention, the PRB resource allocation rate may be, for example, 2 kHz. Hence, every 0.5 ms, for example, a UE may feed back CQI information and a Node B may reallocate PRBs to maintain desirable performance.

The exemplary update period of 0.5 ms may be called a slot. A subframe may be defined as the period of, for example, two slots. A frame may be defined as a period of 10 ms, for example. In accordance with various embodiments of the invention, the duration of slot, subframe and/or frame may be defined arbitrarily.

In E-UTRA, for example, the quantity of feedback information may be significant and may exceed the uplink feedback load of, for example, HSDPA. Among the reasons for the significant quantity of feedback data may be the number of PRBs and the usage of multiple antennas (MIMO). For example, in the case of N receive and M transmit antennas, where N≦M for example, the mobile terminal (or UE) may be receiving up to N simultaneously streams of data over a given set of frequencies (PRBs). In these instances, it may be desirable to report the channel quality not only as a function of PRBs, but also as a function of the simultaneous streams of data. It may be desirable, therefore, to reduce the feedback information.

With reference to FIG. 1B, the received signal Y may be described by the following relationship:

$$Y = HX + n$$

where $X = [x_1, x_2, \ldots x_M]^T$ may be a column vector with M elements of transmitted signals at M transmit antennas, $Y = [x_1, x_2, \ldots x_N]^T$ may be a column vector with N elements of received signals from N receive antennas, H may be a channel matrix of dimensions N by M for a given frequency resource k, whereby the index k may be omitted for simplicity. n may be a noise and interference column vector of dimension N. The UE receiver may be enabled to decode and measure up to, for example, N coded streams. For example, a Minimum Mean Square Error (MMSE) receiver may be used to estimate the transmitted signals from the received signals. At the MMSE receiver, the quality of the data streams may be measured. An exemplary quality measure may be a Signal-to-Noise-Ratio (SNR). In instances of N data streams, the UE receiver may generate one measurement per stream, for example $SNR_i$, $i \in \{1, 2, \ldots, M\}$.

The ergodic capacity $C_i$ of a data stream i and a carrier frequency k (index k may be omitted for simplicity) may be defined by the following relationship:

$$C_i(t) = W \log_2(1 + SNR_i)$$

where W may be the bandwidth of the carrier k, t may be a time index, and i may be a data stream index. The value of capacity $C_i(t)$ may be measured in bits/sec/Hz and may represent a potential capability of a carrier to deliver information. The capacity $C_i(t)$ may therefore be used as a Channel Quality Indicator (CQI) for feedback to the Node B. For example, based on a set of capacities over frequencies and users $\{C_i(t)\}$, the network may allocate resources, for example PRBs to UEs. The network may aim to optimize certain performance measures, for example throughput. In some instances, the quantity of feedback information may be significant and may occupy a significant part of the available uplink throughput capacity. Hence, it may be desirable to compress feedback information and efficiently transfer the feedback information from the UE to the Node B.

Computation of the capacity $C_i(t)$ may impose added complexity with respect to certain other performance measures, for example due to the computation of the log function. However, using the capacity as a feedback quantity may reduce the amount of required feedback information with respect to some other channel quality measures. Notwithstanding, in accordance with various embodiments of the invention, the invention may be applied for any feedback data, for example SNR and/or capacity C, or an arbitrary other measurement quantity that may reflect the ability of a specific frequency resource to deliver information.

The capacity per carrier $C_i(t)$ defined above may be computed in the UE, at the received subframe-rate, for example. This may be facilitated by receiving dedicated carriers known as reference signals (RS) that may bear known data values. The assignment of the RS to carriers may be shared between UEs in the cell and the Node B. The UE may monitor the RS carriers, for example at the subframe rate, and may utilize the data on the RS carriers to estimate the channel response as well as interference levels, in order to estimate the capacity of the RS carriers. The capacity of the RS carriers may be used to infer a capacity estimate for suitable data carrying carriers. For each slot, a UE may comprise a dedicated subset of RS carriers. However, since the tones may be shared by all cells (or sectors), each cell may have a unique set of RS carriers, which may use different sequences of tones at each slot, in some instances. For example, by the end of a frame period, the RS set may comprise a sufficiently large number of RS carriers, which may assist in the computation of the capacity over the available bandwidth.

Figure 2:
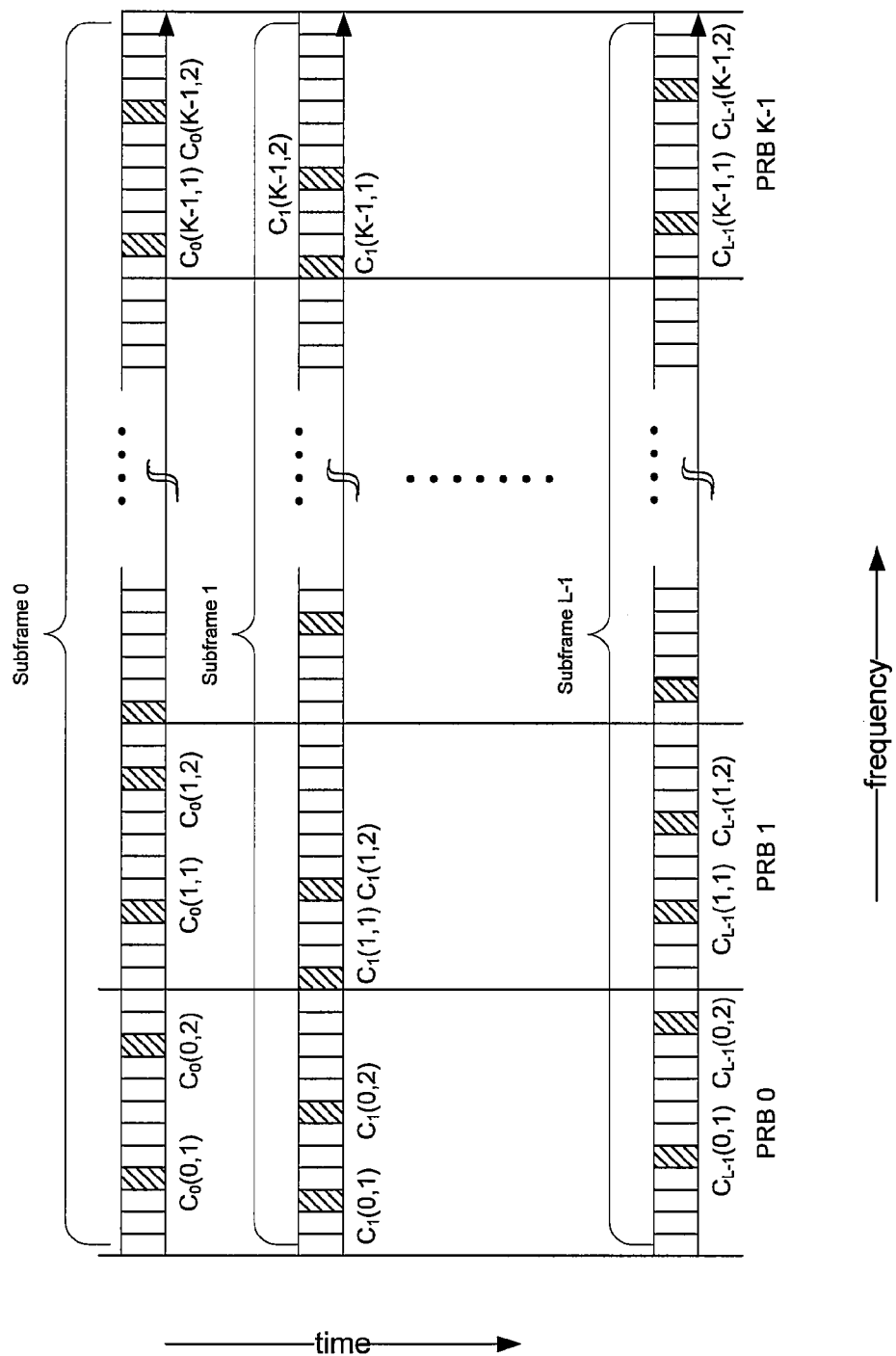
FIG. 2 is an exemplary time-frequency diagram illustrating capacity determination in accordance with an embodiment of the invention.

FIG. 2 is an exemplary time-frequency diagram illustrating capacity determination in accordance with an embodiment of the invention. Referring to FIG. 2, there is shown a time axis and a frequency axis. The frequency axis may be divided into K PRBs. Each PRB may be divided, for example, into 12 carriers (or tones). In each PRB, there may be multiple reference signals (RS), marked in a hatched pattern. In this exemplary embodiment of the invention, there may be 2 RS per PRB. In general, there may be an arbitrary number G of RS per PRB. The time axis may be divided into units of subframes, illustrating L sub-frames. For each RS, a capacity $C_I(k,g)$ may be determined, where I may be an index for the associated sub-frame, k may be an index for the associated PRB, and g may be the index to G=2, the number of RS measurements per PRB.

FIG. 2 may illustrate a scenario as described above for FIG. 1B. The set $S0 = \{C_0(0), \ldots C_0(K-1)\}$ may represent the capacity measured at subframe 0, for K PRBs. For each PRB there may be G measurement, as described above. For example, $C_0(0)$ may be computed from $C_0(0,1)$ and $C_0(0.2)$. At each PRB the RS frequencies may be offset so different frequencies may be used to represent the capacity at different time-frequency instances. Therefore, the ensemble of sets $S_0$, $S_1, \ldots S_{L-1}$ may represent the exemplary capacity over the measured bandwidth, for the duration of a frame (comprising L sub-frames) and for a UE. At the same instance, two cells may transmit RS on two ensembles $\{S_0, S_1, \ldots S_{L-1}\}$, however, the RS may be mapped onto a different sequence of frequencies. While the RS carriers selected for each PRB may be different at a given instant in time, the number of RS carriers per PRB may generally be equal over the entire bandwidth. Notwithstanding, the invention may not be limited in this regard and there may be an arbitrary number of RS carriers for each PRB.

As illustrated in FIG. 2, for example, at PRB-0, subframe-0, there may be two measurements made at two RS carriers, marked in a hatched pattern. According to one embodiment of the invention, the mean value of $C_0(0,1)$ and $C_0(0.2)$ may represent the capacity $C_0(0)$. According to various embodiments of the invention $C_0(0)$ may be an arbitrary function of $\{C_0(0,1), C_0(0.2), \ldots C_0(0.G)\}$. FIG. 2 may also show that at PRB-0, subframe-1, two different RS carriers may represent the capacity at $C_1(0)$. While the location of the RS carriers at each PRB and subframe may change, the number of RS frequencies may generally be the same for all PRBs, as described above.

In accordance with an embodiment of the invention, capacity and/or SNR may be fed back by a differential protocol that may account for the changes in the time-domain (between consecutive subframes) and/or the changes in the frequency domain (changes between two consecutive PRB). The rate of change in the frequency and time domain may be independent. For example, a stationary UE may experience a nearly constant $S_i$ with small changes between subframes, while there may be large variations due to frequency selectivity inside the set members $C_i(n)$ and $C_j(n)$, for $i \neq j$. In these instances, the difference between, for example, $S_i$, $S_{i+1}$ may be small. A complement Doppler scalar $\alpha'$ may be defined by the following relationship:

$$\alpha' = 1 - W(n)/W_{max}$$

where $W(n)$ and $W_{max}$ may be the current Doppler frequency and estimated maximum Doppler frequency, respectively. A complement delay-spread scalar $\beta'$ may be defined by the following relationship:

$$\beta' = 1\tau(n)/\tau_{max};$$

where $\tau(n)$, $\tau_{max}$ may be the currently measured delay spread and the estimated maximum expected delay spread, respectively. The normalized pair $(\alpha, \beta)$ may be defined by the following relationship:

$$\alpha = \alpha'/(\alpha' + \beta')$$

$$\beta = \beta'/(\alpha' + \beta')$$

The parameters $\alpha, \beta$ may comprise the following properties: $\alpha, \beta \leq 1$; $\alpha + \beta = 1$. The magnitude of the estimated maximum Doppler frequency, $W_{max}$, and the estimated maximum delay spread, $\tau_{max}$, may be known and/or estimated. The currently measured delay-spread, $\tau(n)$, and the current Doppler frequency, $W(n)$, may be estimated from the received signal, for example. In accordance with an embodiment of the invention, the ratios $\tau(n)/\tau_{max}$ and $W(n)/W_{max}$ may be examples of scalars that may comprise smaller variance than a set of numbers which they may represent. Generating a difference that may be a weighted sum of two differences may reduce the variation of the difference and, therefore, may require a smaller number of bits for transmission. This may be demonstrated by the following relationships. The sets $$S_m = \{C_m(0), C_m(1), \ldots C_m(N-1)\}$$

$$S_{m+1} = \{C_{m+1}(0), C_{m+1}(1), \ldots C_m(N-1)\}$$

may represent sets of estimated capacities for subframes m, m+1 and PRB's 0, 1, ..., (K-1). In creating a difference between two adjacent measurements, there are two choices that may represent change in the time domain or change in the frequency domain. A difference along the time domain (between two adjacent subframes elements) may be given by the following relationship:

$$\Delta C_{Time} = C_{m+1}(n) - C_{m+1}(n);$$

A difference along the frequency domain (between two adjacent PRBs) may be given by the following relationship:

$$\Delta C_{Frequency} = C_{m+1}(n) - C_{m+1}(n-1);$$

It may be desirable that the quantities for feedback may be of small variance, as this may reduce the number of bits required for feedback. For feedback of one of the difference terms given above, one may consider channel characteristics. For example, it may desirable for a nearly stationary mobile terminal, which may feature a nearly constant channel with small changes between two adjacent subframes, to feedback a difference in time. This case may be characterized by a relatively small Doppler frequency and, therefore small $\alpha'$ and large $\alpha$.

In instances of flat fading, a feedback of a frequency difference may be desirable. Flat fading may be characterized by relatively short delay-spread and a small $\beta'$ and large $\beta$.

In accordance with various embodiments of the invention, a time-frequency difference may be generated, given by the following relationship:

$$\Delta C_{Time-Frequency} = \alpha \Delta C_{Time} + \beta \Delta C_{Frequency}$$

It may be observed that in instances of a large difference of the capacity along the time-domain, the weighted difference $\alpha \Delta C_{Time}$ may be small due to a small value of $\alpha$. A similar argument may be made for the second component $\beta \Delta C_{Frequency}$, when there may be large variation in the capacity along the frequency domain. The construction of $C_{m+1}(n)$ may be enabled by the following relationships:

$$C_{m+1}(n) = C_{m+1}(n) + \alpha \Delta C_{Time}; \quad (1)$$

$$C_{m+1}(n) = C_{m+1}(n-1) + \beta \Delta C_{Frequency}; \quad (2)$$

Multiplying equation (1) and equation (2) by $\alpha$ and $\beta$, respectively, and summing the two resulting equations may result in the following relationship:

$$C_{m+1}(n) = \alpha C_m(n) + \beta C_{m+1}(n-1) + \Delta C_{Time-Frequency} \quad (3)$$

since $\alpha + \beta 3 = 1$. Equation (3) may illustrate the relation between $\alpha$, $\beta$, $C_m(n)$ and $C_{m+1}(n-1)$. Equation (3) may be a recursive difference formula with initial conditions that may be known to both the UE and the Node B. Further parameters $C_m(n)$ may be determined by an iterative rule that may specify given values reflecting the channel conditions. In anther embodiment of the invention, equation (3) may be chosen differently and may, for example, comprise a higher order difference equation that may compute a weighted sum of a current correction term and a previous set of correction terms.

The scalars $\alpha$ and $\beta$ may be sent to the Node B. Alternatively, in some instances, these values may be transmitted to the mobile terminal, based on variation measured by the Node B, for example. In one embodiment of the invention, $\alpha$ and $\beta$ may be computed as described above. In another embodiment of the invention, a ratio of (mean variance)/maximum-variance along the time domain may be utilized for $\alpha$. Similarly, $\beta$ may be computed from (mean variance)/maximum-variance along the frequency domain, where the mean-variance may be the average of a number of subframes and the maximum-variance may be derived from channel statistics. The weighting coefficients α and/or β may be adjusted dynamically in an adaptive manner, based on, for example, channel state information.

According to an exemplary embodiment of the invention, whereby one feedback bit may be allocated to the pair α, β, logic 1 may indicate {α=156, β=0} and logic 0 may indicate {α=0, β=1}. In this case, either the difference along the time domain or the difference along the frequency domain may be used. Correspondingly, two feedback bits may represent 4 levels, corresponding to 4 combinations of α and β.

In accordance with an embodiment of the invention, a method and system for dynamic adaptation and communicating differences in frequency-time dependent systems may comprise generating a time difference weighting factor, for example α, and a frequency difference weighting factor, for example β, based on at least channel estimates, as described for FIG. 2. A time-frequency difference $\Delta C_{Time-Frequency}$ may be computed by forming a weighted sum comprising a time difference and a frequency difference by using at least the time difference weighting factor and the frequency weighting factor. A channel quality indicator (CQI) feedback message may be generated, comprising the time-frequency difference.

The time difference weighting factor, for example α, and/or the frequency difference weighting factor, for example β, may be generated adaptively at a base station or a mobile terminal, for example MIMO transmitter 102 or MIMO receiver 104, as illustrated in FIG. 1B. The time difference, for example $\Delta C_{Time}$, and/or the frequency difference, for example $\Delta C_{Frequency}$, may be generated from estimated Signal-to-Noise-Ratios (SNRs) associated with the channel estimates, as described for FIG. 2. The SNRs may be based on at least the output of an MMSE receiver. The time difference and/or the frequency difference may be generated from estimated capacities, for example $C_0(0,1)$ obtained from RS carriers as shown in FIG. 2, associated with the channel estimates, which may be obtained based on at least an output of an MMSE receiver. The time-frequency difference may be generated according to the following relationship:

$$\Delta C_{Time-Frequency} = \alpha \Delta C_{Time} + \beta \Delta C_{Frequency}$$

where $\Delta C_{Time-Frequency}$ may be the time-frequency difference, $\Delta C_{Time}$ may be the time difference, $\Delta C_{Frequency}$ may be the frequency difference, α may be the time difference weighting factor, and β may be the frequency difference weighting factor. The time difference weighting factor and/or the frequency difference weighting factor may be generated according to the following relationship, described for FIG. 2:

$$\alpha = \alpha'/(\alpha' + \beta')$$

$$\beta = \beta'/(\alpha' + \beta')$$

$$\alpha' = 1 - W(n)/W_{max}$$

$$\beta' = 1 - \tau(n)/\tau_{max}$$

where α may be the time difference weighting factor, β may be the frequency difference weighting factor, τ(n) may be an estimated delay spread, $\tau_{max}$ may be an estimated maximum delay spread, W(n) may be an estimated Doppler frequency, and $W_{max}$ may be an estimated maximum Doppler frequency. In accordance with various embodiments of the invention, α' and β' may be generated from $$\alpha' = 1 - a/A$$

$$\beta' = 1 - b/B$$

where a may be an estimated mean variance along a time domain, and A may be an estimated maximum variance along the time domain, b may be an estimated mean variance along a frequency domain, and B may be an estimated maximum variance along the frequency domain.

Another embodiment of the invention may provide a machine-readable storage, having stored thereon, a computer program having at least one code section executable by a machine, thereby causing the machine to perform the steps as described above for dynamic adaptation and communicating differences in frequency-time dependent systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
    generating a time domain difference weighting factor and a frequency domain difference weighting factor, based on at least channel estimates;
    computing a time-frequency domain difference by forming a weighted sum comprising a time domain difference and a frequency domain difference, said forming using at least said time domain difference weighting factor and said frequency domain weighting factor, wherein said computing said time-frequency domain difference occurs according to the following relationship:

$$\Delta C_{Time-Frequency} = \alpha \Delta C_{Time} + \beta \Delta C_{Frequency}$$

where $\Delta C_{Time-Frequency}$ is said time-frequency domain difference, $\Delta C_{Time}$ is said time domain difference, $\Delta C_{Frequency}$ is said frequency domain difference, α is said time domain difference weighting factor, and β is said frequency domain difference weighting factor; and generating a channel quality indicator (CQI) feedback message comprising said time-frequency domain difference.

2. The method according to claim 1, comprising generating said time domain difference weighting factor and/or said frequency domain difference weighting factor adaptively at a base station.

3. The method according to claim 1, comprising generating said time domain difference weighting factor and/or said frequency domain difference weighting factor adaptively at a mobile terminal.

4. The method according to claim 1, comprising generating said time domain difference and/or said frequency domain difference from estimated Signal-to-Noise-Ratios (SNRs) associated with said channel estimates.

5. The method according to claim 4, comprising obtaining said estimated SNRs based on at least an output of a Minimum Mean Square Error (MMSE) receiver.

6. The method according to claim 1, comprising generating said time domain difference and/or said frequency domain difference from estimated capacities associated with said channel estimates.

7. The method according to claim 6, comprising acquiring said estimated capacities based on at least an output of an MMSE receiver.

8. The method according to claim 1, comprising generating said time domain difference weighting factor and/or said frequency domain difference weighting factor according to the following relationship:

$$\alpha = \alpha'(\alpha' + \beta')$$

$$\beta = \beta'/(\alpha' + .-beta.')$$

$$\alpha' = 1 - W(n)/W_{max}$$

$$\beta' = 1 - \tau(n)/\tau_{max}$$

where $\alpha$ is said time domain difference weighting factor, $\beta$ is said frequency domain difference weighting factor, $\tau(n)$ is an estimated delay spread, $\tau_{max}$ is an estimated maximum delay spread, $W(n)$ is an estimated Doppler frequency, and $W_{max}$ is an estimated maximum Doppler frequency.

9. The method according to claim 1, comprising generating said time domain difference weighting factor and/or said frequency domain difference weighting factor according to the following relationship:

$$\alpha = \alpha'(\alpha' + \beta')$$

$$\beta = \beta'/(\alpha' + .-beta.')$$

$$\alpha' = 1 - a/A$$

$$\beta' = 1 - b/B$$

where $\alpha$ is said time domain difference weighting factor, $\beta$ is said frequency domain difference weighting factor, a is an estimated mean variance along a time domain, and A is an estimated maximum variance along said time domain, b is an estimated mean variance along a frequency domain, and B is an estimated maximum variance along said frequency domain.

10. A system for processing communication signals, the system comprising:
one or more circuits, said one or more circuits enable:
generation of a time domain difference weighting factor and a frequency domain difference weighting factor, based on at least channel estimates;

computation of a time-frequency domain difference by forming a weighted sum comprising a time domain difference and a frequency domain difference, said forming using at least said time domain difference weighting factor and said frequency weighting factor, wherein said one or more circuits compute said time-frequency domain difference according to the following relationship:

$$\Delta C_{Time-Frequency} = \alpha \Delta C_{Time} + \beta \Delta C_{Frequency}$$

where $\Delta C_{Time-Frequency}$ is said time-frequency domain difference, $\Delta C_{Time}$ is said time domain difference, $\Delta C_{Frequency}$ is said frequency domain difference, $\alpha$ is said time domain difference weighting factor, and $\beta$ is said frequency domain difference weighting factor; and generation of a channel quality indicator (CQI) feedback message comprising said time-frequency domain difference.

11. The system according to claim 10, wherein said one or more circuits generate said time domain difference weighting factor and/or said frequency domain difference weighting factor adaptively at a base station.

12. The system according to claim 10, wherein said one or more circuits generate said time domain difference weighting factor and/or said frequency domain difference weighting factor adaptively at a mobile terminal.

13. The system according to claim 10, wherein said one or more circuits generate said time domain difference and/or said frequency domain difference from estimated Signal-to-Noise-Ratios (SNRs) associated with said channel estimates.

14. The system according to claim 13, wherein said one or more circuits obtain said estimated SNRs based on at least an output of a Minimum Mean Square Error (MMSE) receiver.

15. The system according to claim 10, wherein said one or more circuits generate said time domain difference and/or said frequency domain difference from estimated capacities associated with said channel estimates.

16. The system according to claim 15, wherein said one or more circuits acquire said estimated capacities based on at least an output of an MMSE receiver.

17. The system according to claim 10, wherein said one or more circuits generate said time domain difference weighting factor and/or said frequency domain difference weighting factor according to the following relationship:

$$\alpha = \alpha'(\alpha' + \beta')$$

$$\beta = \beta'/(\alpha' + .-beta.')$$

$$\alpha' = 1 - W(n)/W_{max}$$

$$\beta' = 1 - \tau(n)/\tau_{max}$$

where $\alpha$ is said time domain difference weighting factor, $\beta$ is said frequency domain difference weighting factor, $\tau(n)$ is an estimated delay spread, $\tau T_{max}$ is an estimated maximum delay spread, $W(n)$ is an estimated Doppler frequency, and $W_{max}$ is an estimated maximum Doppler frequency.

18. The system according to claim 10, wherein said one or more circuits generate said time domain difference weighting factor and/or said frequency domain difference weighting factor according to the following relationship:

$$\alpha = \alpha'(\alpha' + \beta')$$

$$\beta = \beta'/(\alpha' + \beta')$$

$$\alpha' = 1 - a/A$$

$$\beta' = 1 - b/B$$

where $\alpha$ is said time domain difference weighting factor, $\beta$ is said frequency domain difference weighting factor, a is an estimated mean variance along a time domain, and A is an estimated maximum variance along said time domain, b is an estimated mean variance along a frequency domain, and B is an estimated maximum variance along said frequency domain.

* * * * *